A. J. HARLAN, Sr.
WHEEL.
APPLICATION FILED DEC. 29, 1913.
1,108,749.
Patented Aug. 25, 1914.
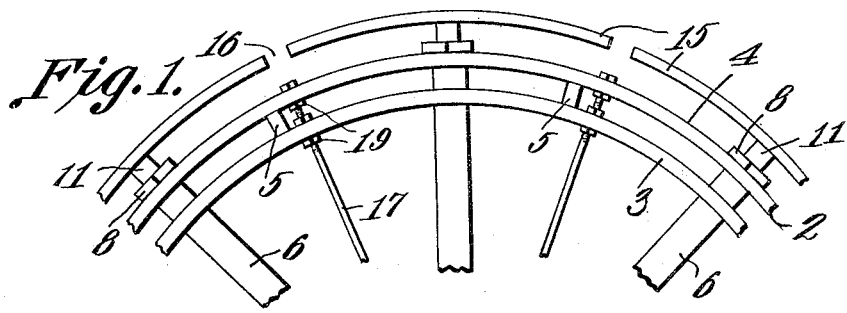
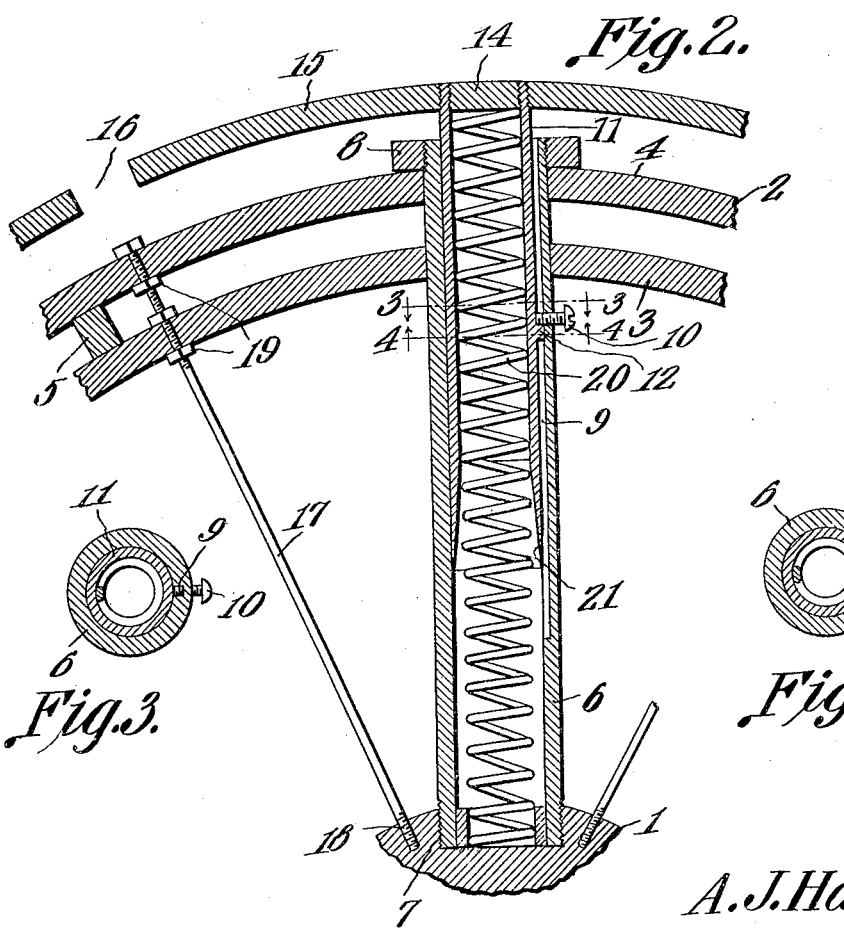

UNITED STATES PATENT OFFICE.

ANDREW J. HARLAN, SR., OF LONDON MILLS, ILLINOIS.

WHEEL.

1,108,749.  Specification of Letters Patent.  Patented Aug. 25, 1914.

Application filed December 29, 1913. Serial No. 809,346.

*To all whom it may concern:*

Be it known that I, ANDREW J. HARLAN, Sr., a citizen of the United States, residing at London Mills, in the county of Fulton and State of Illinois, have invented a new and useful Wheel, of which the following is a specification.

The device forming the subject matter of this application is a spring wheel, and one object of the present invention is to provide a device of this type in which pneumatic tires and other elements subject to puncture may be dispensed with.

The invention aims to provide novel means for procuring a resilient action between a pair of telescoping spoke elements, novel means being provided for limiting the relative movement between the spoke elements under the action of the spring which permits telescoping movement between the spoke elements.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawing:—Figure 1 shows in fragmental side elevation, a wheel constructed in accordance with the present invention; Fig. 2 shows a portion of a wheel constructed in accordance with the present invention, Fig. 2 being a sectional view in which the cutting plane is passed along the median line of the wheel; Fig. 3 is a cross section on the line 3—3 of Fig. 2; Fig. 4 is a cross section on the line 4—4 of Fig. 2.

The wheel herein disclosed comprises a hub 1 and a rim 2. The rim 2 is a composite structure and includes an inner band 3 and an outer band 4 spaced apart by blocks 5 which may be connected with one or both of the bands.

A plurality of primary tubular spokes 6 are provided, each spoke 6 being threaded at one end as indicated at 7 or otherwise constructed for engagement with the hub 1. The outer ends of the primary tubular spokes pass outwardly through the bands 3 and 4 of the rim 2 and a nut 8 is applied to the outer end of each primary tubular spoke 6, the nut 8 bearing against the outer face of the outer band 4 of the rim. In its interior, each primary tubular spoke 6 is provided with a longitudinal groove 9, constituting a guide. A screw, pin or like removable element 10 is inserted through the primary tubular spoke 6 and enters the groove 9.

Mounted to reciprocate in each primary tubular spoke 6 but fitting closely therein is a secondary tubular spoke 11 provided at one side with a lug 12 which is slidably received in the groove 9 of the primary spoke 6 and lies between the screw 10 and the hub 1. Into the outer end of each secondary tubular spoke 11 is threaded or otherwise secured a plug 14.

The thread portion of the wheel may be of any desired form, but in the present instance is shown as comprising a plurality of shoes 15, each shoe 15 being mounted upon the outer end of one secondary tubular spoke 11, the ends of the respective shoes 15 being spaced apart slightly as indicated at 16.

If desired, the hub 1 may be connected with the rim 2 by means of tensile spokes 17, the inner ends of which may be threaded as indicated at 18, or otherwise adapted for engagement with the hub 1. The outer ends of the spokes 17 pass through the bands 3 and 4 of the rim 2 and carry nuts 19 which bear against the opposed faces of the respective bands.

Mounted within the spokes 6 and 11 is a helical compression spring 20, one end of which abuts against the hub 1, the other end of which abuts against the plug 14. As shown in Fig. 2, the spring 20 is of a common diameter from end to end, so that the spring may be compressed readily, and with this result in view the spoke 11 is reamed out at its inner end at 21 to prevent the spoke from catching the convolutions of the spring should the spring bend laterally.

The tendency of the spring 20 is to force the secondary tubular spoke 11 outwardly and thus afford a resilient support for the shoe 15, outward movement of the secondary spoke under the action of the spring being limited by the engagement between the lug 12 and screw 10.

In practice, the screw 10 is first removed and the secondary tubular spoke 11 is slid into place, whereupon the screw 10 is inserted, the parts then appearing as shown in Fig. 2.

Having thus described the invention, what is claimed is:—

1. In a device of the class described, a hub; a primary tubular spoke secured to the hub and provided in its interior with a longitudinal guide which opens through the end of the primary spoke; a secondary spoke slidable within the primary spoke and provided with a projection slidable in the guide and coöperating with the guide to limit relative rotation between the spokes; a movable element in the primary spoke and entering the guide and adapted to engage the projection to limit relative longitudinal movement in the spokes; a tread carried by the secondary spoke; and spring means for supporting the secondary spoke.

2. In a device of the class described, a hub; a rim comprising inner and outer parts; a primary tubular spoke connected with the hub and passing through the rim parts; a securing device on the primary spoke and engaging one rim part; a secondary, spring supported spoke slidable within the primary spoke; a tread carried by the secondary spoke; a tensional spoke connected with the hub and passing through the rim parts; and means on the tensional spoke for engaging the rim parts.

In testimony that I claim the foregoing as my own, I have hereto affixed my signature in the presence of two witnesses.

ANDREW J. HARLAN, Sr.

Witnesses:
D. Douglas Bourae,
Bertha A. Beer.

---

Copies of this patent may be obtained for five cents each, by addressing the "Commissioner of Patents, Washington, D. C."